US010404757B1

(12) United States Patent
Horton

(10) Patent No.: US 10,404,757 B1
(45) Date of Patent: Sep. 3, 2019

(54) PRIVACY ENFORCEMENT IN THE STORAGE AND ACCESS OF DATA IN COMPUTER SYSTEMS

(71) Applicant: Bluebird Labs, Inc., Boulder, CO (US)

(72) Inventor: Noah Horton, Boulder, CO (US)

(73) Assignee: Bluebird Labs, Inc., Boulder, CO (US)

( * ) Notice: Subject to any disclaimer, the term of this patent is extended or adjusted under 35 U.S.C. 154(b) by 0 days.

(21) Appl. No.: 16/015,059

(22) Filed: Jun. 21, 2018

(51) Int. Cl.
  *H04L 29/06* (2006.01)
  *G06F 21/62* (2013.01)
  *G06F 21/64* (2013.01)

(52) U.S. Cl.
  CPC .......... *H04L 63/20* (2013.01); *G06F 21/6218* (2013.01); *G06F 21/645* (2013.01); *H04L 63/08* (2013.01); *H04L 63/10* (2013.01)

(58) Field of Classification Search
  CPC ... G06F 21/6218; G06F 21/6245; H04L 63/10
  See application file for complete search history.

(56) References Cited

U.S. PATENT DOCUMENTS

| 7,403,956 | B2 | 7/2008 | Vaschillo et al. | |
|---|---|---|---|---|
| 8,091,142 | B2* | 1/2012 | Liu | G06F 21/10 705/51 |
| 9,576,147 | B1* | 2/2017 | McClintock | G06F 21/6218 |
| 2008/0184329 | A1* | 7/2008 | Cross | G06F 21/6218 726/1 |
| 2011/0113076 | A1* | 5/2011 | Jo | G06F 17/30117 707/822 |
| 2014/0172808 | A1* | 6/2014 | Burge | G06F 21/604 707/694 |
| 2014/0380404 | A1* | 12/2014 | Raj | G06F 21/6218 726/1 |
| 2015/0242619 | A1* | 8/2015 | Bender | G06F 21/577 726/22 |
| 2016/0127379 | A1* | 5/2016 | Nayshtut | G06F 21/554 726/1 |
| 2016/0132252 | A1* | 5/2016 | Bish | G06F 3/0652 711/159 |
| 2017/0053130 | A1* | 2/2017 | Hughes | G06F 21/6227 |
| 2017/0093916 | A1* | 3/2017 | Arumugam | G06F 17/30082 |
| 2018/0075104 | A1 | 3/2018 | Oberbreckling et al. | |

* cited by examiner

*Primary Examiner* — Thaddeus J Plecha
(74) *Attorney, Agent, or Firm* — Davis Wright Tremaine LLP

(57) ABSTRACT

Systems and methods for storing and accessing data according to privacy policies are described herein. Data elements may be associated annotations that encode one or more policies that define how the data element may be used. The data element may be stored in association with the annotation. Whether access to the stored data element should be granted may be evaluated based at least in part on an access scheme for the data element.

20 Claims, 8 Drawing Sheets

PRIVACY ENFORCEMENT IN THE STORAGE AND ACCESS OF DATA IN COMPUTER SYSTEMS

CROSS-REFERENCE TO RELATED APPLICATION

This application is related to and incorporates by reference for all purposes the full disclosure of co-pending U.S. patent application Ser. No. 15/942,373, filed Mar. 30, 2018, entitled "SEMANTICS DATA PROCESSING".

BACKGROUND

Traditionally, data has been organized using various systems, and structured record stores have been utilized in the past to create, update, read, and delete data, which can be stored in various formats. In many systems, structured record stores are designed around the notion of security. Security techniques may be utilized to determine whether certain entities are entitled to access certain data. For example, in some data stores, when an entity connects to the data store to access data of the data store, the entity presents credentials that attest to the identity of the entity. The credentials may be associated with a particular user, application, etc. that is mapped to a set of permissions that define a grant or denial of access to perform one or more operations in association with the data.

However, there are many challenges to adapting traditional structured record stores for the storage and access of data in modern systems. Modern data storage systems may be utilized to store various types of data that are subject to various privacy policies—for example, consumer applications may store consumer data that are subject to laws, legal norms, intersecting privacy policies, and more. Existing structured record stores are ill-suited to manage data in the manner described above. Accordingly, it may be desirable to implement systems and methods for privacy enforcement in the storage and access of data across various types of computer systems to improve the security and privacy surrounding the access of data.

BRIEF DESCRIPTION OF THE DRAWINGS

Various techniques will be described with reference to the drawings, in which.

DETAILED DESCRIPTION

Figure 1:
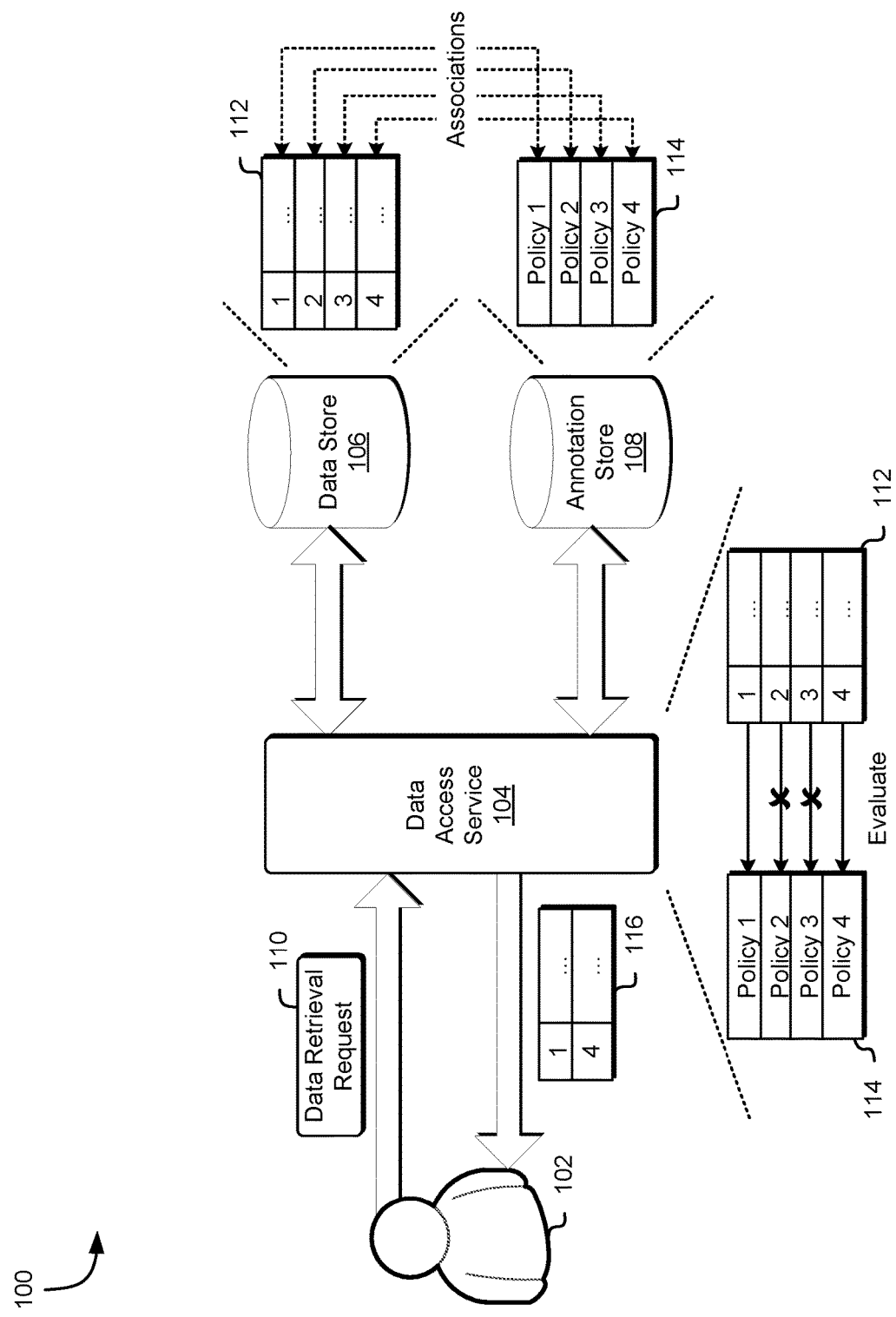
FIG. 1 illustrates an example environment in which various embodiments may be implemented.

This present disclosure relates to systems and methods for storing and accessing data according to privacy policies which may be context-specific. Data elements may be subject to one or more restrictions on the subsequent use and access of the data element. These restrictions may include, for example, laws governing or restricting the manner in which the data element may be used, accessed, modified, stored, and presented, security policies of an organization collecting the data element which define parameters for how the data element is to be collected, a set of conditions upon which a customer agrees to provide the data element (e.g., personal information of the customer such as age, address, interests), and more. In some cases, the same type of data element (e.g., biographical information such as age, address, and interests) collected from multiple sources (e.g., different individuals) may be subject to different restrictions. For example, if a first set of data collected from an adult may be subject to a different set of restrictions than a second set of data collected from a minor based at least in part on applicable privacy laws that apply only to minors of the applicable jurisdiction. Accordingly, it has been made apparent that there are various challenges with regard to the storage and access of such data as described above, and it may be desirable to create and implement systems and methods that manage the complex challenges surrounding the storage and access of data which may be subject to disparate restrictions. Such systems and methods are described in this disclosure.

Annotations—also referred to as annotated data elements throughout this disclosure—may, in accordance with various embodiments, refer to information that encodes and/or is usable to determine a set of policies that are associated with stored data. In some cases, the annotations include a list of policies using any suitable data structure (e.g., a vector) that encode, in a computer-meaningful format, restrictions on the use of data. Human-readable policies may be mapped onto the computer-meaningful format by a developer administrator, or any suitable authorized user. Annotations may also encode one or more properties of the data and/or the manner in which the data is collected or stored, which may be utilized to determine additional policies. As an example, personal information collected about an individual may be parsed to infer whether a particular jurisdiction's laws regarding minors apply to the manner in which the data is stored, retained, aggregated, presented, etc.

In various embodiments, an interface is used to store data. The interface may, for example, be a web API request that allows a requestor to store data, as well as provide context information or metadata associated with the storage of the data. Context information may include information as to how, where, and from whom the data was collected which, in turn, may be used to identify implied policies. For example, context information may encode information that indicates that the data being stored was obtained on or from a third-party platform or is otherwise subject to privacy policies of the third-party platform. The context information may be encoded as an annotation that includes a reference to a computer-meaningful version of the third-party platform's privacy policies, and included as part of subsequent evaluations of whether the data should be provided for various requested uses. Annotations, context information, and other related concepts are described in greater detail elsewhere in this disclosure, such as below in connection with FIGS. 1-4.

Accordingly, in some embodiments, a client utilizes the interface to store data by submitting a web API request to store data, whereby the API request encodes or otherwise identifies the data (e.g., a reference usable to obtain the data rather than the data itself may be encoded in the API request). The request may also have a parameter that allows the requestor to specify applicable security policies, privacy policies, laws, context information, metadata, and any combination thereof, and such information may be utilized at least in part to determine whether subsequent access to the data and/or under what circumstances subsequent access to the data is permitted.

In various implementations, the web API request may be received by a data privacy service that sits between the entity storing the data and a structured record store such as a database or data store. The data privacy service may be a computer system that includes one or more processor and memory that stores executable instructions that, as a result of execution, cause the one or more processors to interact with the client (e.g., by providing an interface that the client is able to use to submit data storage requests) and a backend data storage system. The data privacy service may perform various functions, such as determining how and where to store the data, determining annotations that encode policies to be evaluated in connection with requests to access the data, and determining the manner in which annotations are associated with their respective data entries.

In an embodiment, the data privacy service receives a request to store data and stores the data in a structured record store such as a data store or a database. The data privacy service may also parse the request and/or the data as part of determining an annotation for the data, and store the annotation in association with the data. Information parsed from the request may include, for example, an IP address of the request which can be used to infer a geographical location. Storing the annotation in association with the data may be accomplished in any of a variety of ways, such as by tightly coupling the data and the annotation, perhaps as properties of a record or as different columns in a row of a database table. The data and the annotation may also be loosely coupled, such as by storing the data with a reference to the annotation—the reference may be a pointer that may be dereferenced to obtain the location of the annotation, a foreign key that uniquely identifies a row of a database table in which the associated annotation resides, and more. While a database is described in connection with various example implementations, any suitable structured record stores may be utilized to store the data and/or annotations.

Annotations may be used to determine how data, once stored, should be maintained and/or accessed. Annotations may be utilized to ensure that data is not stored indefinitely and removed according to a privacy policy. In an embodiment, an annotation may include a restriction that is based on an organization's policy to delete personal information after 90 days and a background worker executing on a periodic basis or in response to a trigger is utilized to search through the annotations, identify an annotation that indicates the data should be deleted based on a current clock time, and then delete the corresponding data. In an embodiment, the annotation includes a reference that to the corresponding data element, allowing for efficient deletion of the corresponding data from an annotation. An embodiment in which annotations are used to delete or modify data is described elsewhere in this disclosure, such as in connection with FIG. 7.

Annotations may be used to determine whether and in what manner access to data should be granted. Consider, as an example, an organization that gathers data about multiple consumers as part of a marketing effort and stores the data for research. The use of the data may be subject to various policies, such as the terms and conditions under which the consumers agreed to share the data, the organization's own internal policies as with regard to how the data may be shared with the organization's partners, applicable state and federal laws regarding how consumer data may be used and/or shared, and more. Accordingly, a request for data under one context (e.g., the data is requested for internal use within the organization) may be permissible whereas a request for the same data under a different context (e.g., the data is requested to be shared with a partner of the organization) may not be permitted. It should be noted that the same entity may be making these requests, although for different intended uses—in other words, there may be embodiments in which a determination of whether to fulfill a request for data is not based solely on the credentials presented by the requestor, but may also be based at least in part on a request context such as the intended use of the data.

A request for data may be processed in the following manner, in accordance with at least one embodiment: a client submits, via a client computer system, a request for data. The request may be submitted as a web API request via a public interface accessible to the client. The request may be received and/or routed to a data access service that obtains a set of data in accordance with the request. For example, the client request may be for data collected from individuals in the United States. The request may be processed using a query (e.g., SQL SELECT statement) and the data access service may obtain a response (e.g., a result-set) with one or more data entries 116. Additionally, annotations associated with the data entries may be obtained and include restrictions on the proper use of the data entries. In an embodiment, the data access service parses the data entries obtained from the database system to determine which entries satisfy one or more policies encoded in the annotations. The client may provide a request context that is used to evaluate whether particular data entries should be provided as part of the response. For example, if the client indicates the intended use for the data is as part of a research effort related to the use of a class of products (e.g., adult products such as alcohol or cigarettes), the intended use may be mapped to a privacy policy that prohibits the research effort from using data entries collected from minors (e.g., under 18, under 21). The data access service may enumerate through and apply all applicable policies (e.g., as determined based at least in part on the annotation, underlying data, and/or request context) to determine which data entries should be provided to the client. Once all policies have been applied and the appropriate data entries excluded or modified, the remaining set of data entries may be returned to the client as a response to the request.

It should be noted that various implementations are possible and are contemplated within the scope of this disclosure—for example, a client may submit, via a database interface, a command to store data to a database management system, and various functionality and features described above in connection with operation of the data privacy service may be implemented as a module or subcomponent of the database system. Various alternatives are described in greater detail throughout this disclosure, such as those described in connection with FIG. 1.

FIG. 1 illustrates an example environment 100 in which various embodiments may be implemented. In various embodiments, a client 102 submits a data retrieval request to a data access service 104 that applies one or more policies as part of processing the request.

A client 102 as illustrated in connection with FIG. 1 may refer to a client entity or a client computer system that performs operations on behalf of a user. The client 102 may include software module such as an application, library, plug-in, etc. that is used by the client 102 to communicate with a server via one or more commands of an interface as part of a client-server relationship. The server may be the data access service 104. The client 102 may be an entity such as an employee of an organization that submits (e.g., via a client computing device) requests for data collected by and/or accessible to the organization and analyzes the data. For example, the client 102 may be a data scientist that operates a client computing device to submit data retrieval requests such as the data retrieval request 110 illustrated in FIG. 1.

The data access service 104, in an embodiment, is a service of a computing resource service provider that is used to provide access to computing resources such as data stored in one or more backend data storage systems implemented using any suitable storage technology such as those described in connection with FIG. 8 below. The data access service 104 may sit between a client and data storage system (e.g., a structured record store) and facilitates the retrieval of data from the data storage system and applies privacy policies that the data may be subject to, sanitizing the result sets that are provided to the client in response to data retrieval requests. In another embodiment, the data access service may be integrated into the data storage system.

The data access service 104 may be implemented by one or more computer systems having one or more processors and memory that stores instructions that, as a result of execution, cause the data access service 104 to receive data retrieval requests, query structured record stores for data, and parse retrieved data to ensure that data entries provided to the requestor are in compliance with one or more policies, which may be determined based at least in part on annotations associated with the data entries.

In some cases, the data access service 104 interacts with a client 102 using a first interface to receive and fulfill requests for data. The data access service 104 may furthermore interact with a back-end system to retrieve data. The back-end system may be a data storage service, a database management service, or any suitable system for interacting (e.g., accessing and/or manipulating) data of a structured record store. As an example, the client 102 may submit the data retrieval request 110 to the data access service 104 via a command of a first set of APIs and the data access service 104 may use the first API to determine a corresponding command to submit to a database management system according to a second set of APIs suitable for use with the database management system. The design of the interfaces may be related, and may be implemented in accordance with techniques described elsewhere in this disclosure, such as those discussed in connection with FIG. 5.

The data store 106 may refer to a suitable structured record store such as a database, data store, or any other suitable storage system. For example, the data store 106 may be implemented as part of a relational database or a NoSQL (e.g., non-relational) database, or even a simple file system. The data store 106 may be a database that is organized into one or more database tables, each table having one or more rows and columns, the rows corresponding to individual data entries and the columns corresponding to properties. For example, a row may include columns for a unique primary key, a customer identifier, customer data such as address, birthday, etc., and more. In an embodiment, each data element (e.g., each row) of the data store 106 is associated to a corresponding data element of an annotation store 108. The association may be defined in any suitable manner—for example, data entries may be stored in a first database table and the annotations may be stored in a mapped table. A database management system may expose an API to the data access service 104 that facilitates accessing and storing data to the data store. The data store 106 may include one or more tables of data that are organized into rows and columns (or described in similar terms, such as records and fields). The data store 106 may furthermore include indexes that can be used to organize the data (e.g., into a sorted order), seek or search to a particular row in an efficient manner, and more. The data store 106 may also include logs, control files, and other types of metadata that may be used in the operation of the data store.

The annotation store 108 may be implemented using similar techniques to those described in connection with the data store 106. For example, the data store 106 may be a first database table of a database and the annotation store 108 may be a second database table of the same database. As a second example, the data store 106 and the annotation store 108 may be implemented as database tables in different databases. Each annotation or annotation entry may encode one or more policies that restrict the use of a corresponding data element. The structure and data of an annotation entry (e.g., the annotation entries 114 illustrated in FIG. 1) may be in accordance with those described in connection with FIG. 4. As an example, an annotation entry may encode, in a computer-meaningful format, restrictions on the use of a data element associated with the annotation entry.

Various techniques may be utilized by the data access service 104 to obtain annotations. In some cases, the data retrieval request 110 is mapped to a corresponding query or command to obtain the corresponding annotations 114. In some cases, data entries obtained from the data store 106 are used to obtain the annotations. For example, data entries from the annotation store may encode foreign key or references to the location of the corresponding annotation entries. The data access service 104 may submit receive the data retrieval request 110 from the client and map it to a corresponding request that is submitted to a data storage system that is responsible for managing access to the data store 106. In some cases, the query syntax of the client request is different from the request submitted by the data access service 104.

In an embodiment, the data retrieval request 110 is a request generated by the client 102 and submitted to the data access service 104 to access data. The request 110 may be made via an interface, API, command, or any other suitable request mechanism that enables the client 102 to request access to data via the data access service 104. The data retrieval request 110 may include a SQL query that defines a query for a collection of data stored and organized in a database. The data retrieval request 110 may be made via a network, such as the Internet, and encode request metadata such as the IP address of the client 102, which may be utilized to infer the geographical location of the client (e.g., to determine a state in which the client and any applicable laws or regulations associated with that jurisdiction).

The data access service 104 may parse the data retrieval request 110 to determine a corresponding backend request that is used to obtain a set of data entries 112 from the data store 106 using interfaces, commands, requests, etc. such as those described herein above and below. In some embodiments, each data element of the set of data entries 112 includes a reference to a corresponding annotation entry, but such need not be the case, as there are variations in which the annotation entries are retrieval independent of the retrieval of the data entries. The data access service 104 may also obtain a corresponding set of annotation entries 114 from an annotation store 108. For example, a foreign key reference from each data element may be mapped to a corresponding annotation entry that includes policies that are applicable to that data element or even a plurality of data entries. The data access service may determine whether some or all of the set of data entries 112 are to be provided to the client 102 in response to the data retrieval request 110. The determination may be made based on parsing and evaluating the policy, which may include a set of binary conditions that evaluate to TRUE or FALSE, and the evaluation of the entire expression determines whether the data element should be returned to the client 102. In some cases, the request context is used to generate additional policies that are evaluated—for example, if the request is made from a foreign jurisdiction (e.g., a state different from whether the data is stored), a human-readable policies corresponding to policies of the foreign jurisdiction may be mapped onto the computer-meaningful Boolean expression that is evaluated as a necessary or sufficient condition for providing the client with access to the data. As described above, necessary and sufficient conditions may be terms of art understood as formal logic relationships, which are known to one of ordinary skill in the art.

A response including a set of data entries 116 (e.g., a result set) may be provided to the client 102 in response to the data retrieval request 110 after having made a determination that the data entries being provided are not subject to privacy policies that restrict the client 102 from accessing the data. For example, FIG. 1 illustrates an embodiment in which the data access service 104 obtains data entries 1-4 from the data store 106, evaluate those four entries to determine that entries 2 and 3 are subject to privacy policies that indicate access should be restricted, and a result set including only entries 1 and 4 are provided to the client 102 as part of the response 106. The response may, in some embodiments, include additional information, such as an indication that access to some data entries were restricted. In some cases, identifiers for the restricted data entries may also be provided (e.g., corresponding identifiers for data entries 2 and 3 in FIG. 1) and the client 102 may request access to those data entries from an administrator if the client needs to access those entries.

When data is collected and stored, the data may be stored in association with annotations. Various techniques may be utilized to associate the data with the annotations. For example, if the data is stored in a database organized using rows and columns (or any other equivalent paradigm), the data may be stored as a row of a database table, wherein one column is utilized for the storage of annotations. As a second example, the data may be stored in a row of a first database table, and the associated annotation may be stored in a row of a second database table, wherein the row of the second table includes a reference to where the data is stored (e.g., a foreign key).

In an embodiment, a data storage service is implemented to regulate the storage and access of data according to one or more restrictions, which may also be referred to throughout this disclosure as policies, privacy policies, and other similar terms. A data storage service may be utilized to facilitate the storage and access of data between a client (e.g., a client computer system operated by a user) and a structured record store that is used to store data which may be subject to such policies as described above. The data storage service may implement an interface such as a web application programming interface (API) that a client or a device on behalf of a client uses to submit requests to store and retrieve data.

Figure 2:
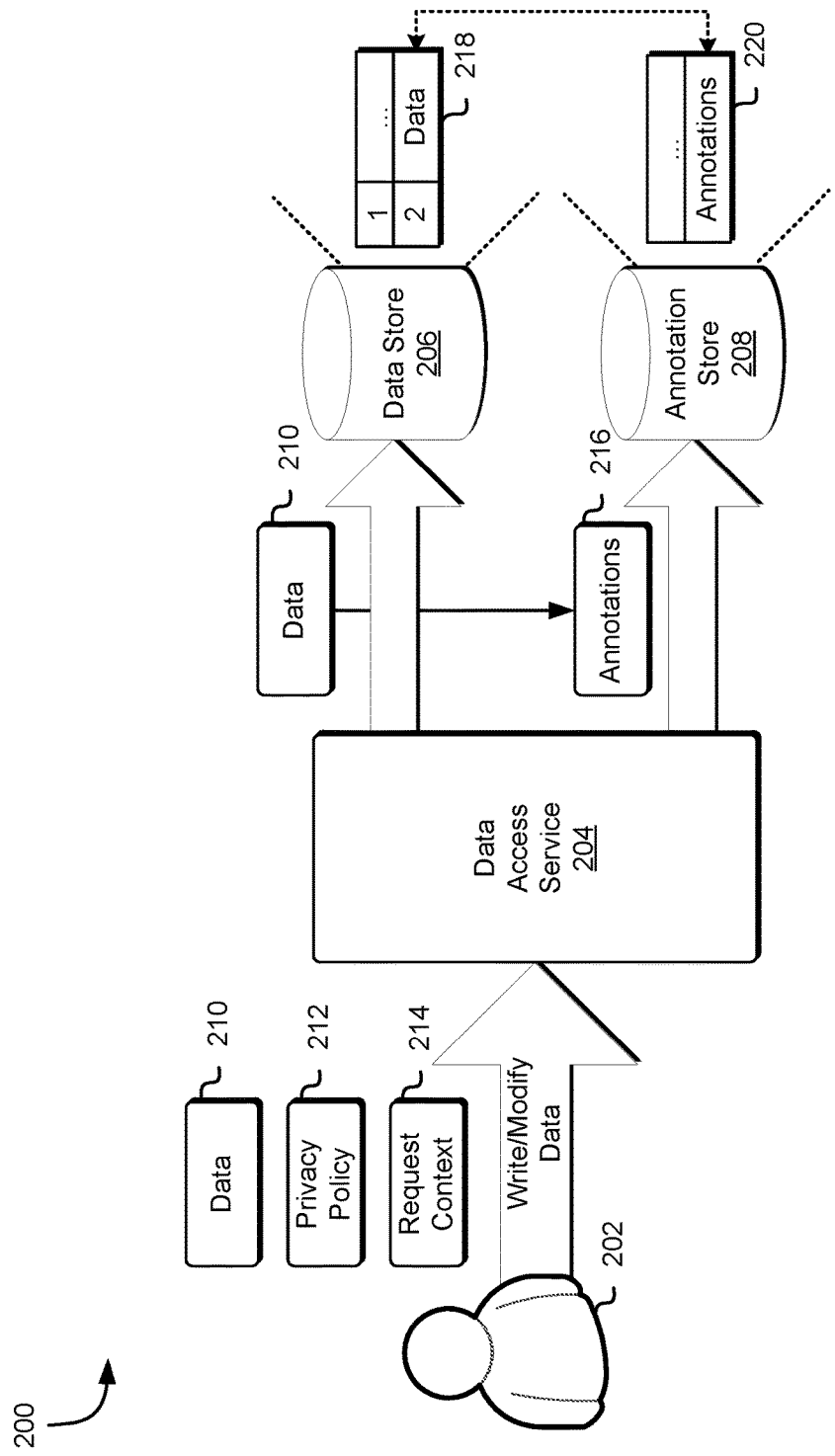
FIG. 2 illustrates a computing environment in which data and annotations are stored in response to a request to write or modify data, in accordance with one embodiment.

FIG. 2 illustrates a computing environment 200 in which data and annotations are stored in response to a request to write or modify data. The client 202, data access service 204, data store 206, and annotation store 208 may be in accordance with those described elsewhere in this disclosure, such as those described in connection with FIG. 1.

In an embodiment, the client 202 refers to a client computing device that is operated by a client entity. The client 202 may submit requests to a data access service 204 as a web API request to a computing resource service provider which is routed over a network to the data access service 204 via one or more intermediate nodes (e.g., routers, switches, front-end service computers). The client may submit various types of requests to the data access service, such as a request to write the data 210 as a new data element or a request to modify an existing data element (or a portion thereof) with the data 210.

The client 202 may submit a request to write or modify data by providing data 210 to write/update. The request may include data 210, privacy policies 212, a request context 214, or any combination thereof. The data 210 illustrated in FIG. 2 may refer to data that is to be stored to a structured record store and may include personal information such as names, ages, addresses, social security numbers, and more. The data (or subsets of the data) may be classifiable as certain types of information, such as protected health information (PHI), personally identifiable information (PII), and more. A request to write data may be accompanied by one or more privacy policies such as the privacy policy 212 illustrated in FIG. 2. The privacy policy 212 may be a representation on a policy that sets one or more conditions on subsequent use of the data 210 and may be encoded in a human-readable format such as a string referencing an organization's internal policies, as a string referencing a privacy regulation, a URI or URL that points to a network location that encodes an applicable privacy policy, and more. The privacy policy 212 may also be encoded as a computer-meaningful format that corresponds to the human-readable policy as described above. The data 210 may be transmitted over a network or between processes in any suitable manner—for example, the data 210 may be fragmented and transmitted as a plurality of fragments over an IP protocol and re-assembled at a destination such as the data access service 204. In various embodiments, information such as the data 210, privacy policy 212, and request context 214 may be transmitted in a coupled manner (e.g., serialized and transmitted together in the same IP packet) or may be transmitted independently of each other.

The request context 214 may include metadata associated with the client 202 making the request and may include packet header information (e.g., IP address) of one or more packets used to transmit the data 210 that is usable to identify one or more implied policies such as those described in greater detail below in connection with FIG. 4. An implied policy may refer to a privacy policy that is not explicitly provided by the requestor, but is determined from other information provided by the requestor, such as an IP address that may be utilized to determine whether a state's privacy policy or relevant law is applicable. For example, data sourced from a particular state may be subject to the state's privacy policies, which may require PHI data to be stored in a particular format (e.g., encrypted under a specific cryptographic algorithm) or stored subject to removal after a fixed duration.

The data access service 204 may be implemented in accordance with those described elsewhere in this disclosure, such as in connection with FIG. 1. The data access service 204 may be a service of a computing resource service provider that provides access to various types of computing resources and various usages of the computing resources. Furthermore, the data access service 204 may be implemented as a software module of a database or database management system, for example, in the manner described below in connection with FIG. 5. The client 202 and data access service 204 may establish a client-server relationship (e.g., through a handshake process) and communicate via a communications session (e.g., encrypted TLS session) to transfer the data 210, privacy policy 212, request context 214, or any combination thereof. The data access service 204 may utilize a combination (e.g., some or all) of the data 210, privacy policy 212, and request context 214 to determine how to store the data 210. In an embodiment, an explicitly provided privacy policy 212 or an inferred privacy policy (e.g., as determined from the request context 214) may be utilized to determine a format to store the data. The data access service 204 may store the data 210 (or a formatted version of the data) in a data store 206 in any suitable manner.

The data store 206 may be utilized as a storage system to store the data 210 in a structured format. For example, the data store 206 may be a database table that the data access service 206 is able to later query and obtain individual records or collections of records using a query request. If the client requests to modify an existing data element (or portion thereof) the data store 206 may seek to a particular row (e.g., based on a unique primary key associated with the existing data element) and replace some or all of the data in the row with the data 210 provided in the request. In an embodiment, the row includes a plurality of properties, some or all of which are updated/overwritten based on the type of data 210 provided. In an embodiment, FIG. 2 illustrates a row 218 in which a particular property field is replaced by the data 210 supplied by the client 202.

The data access service 204 may identify annotations 216 associated with the data 210 that define a set of conditions on the manner in which the data 210 may be subsequently access. In an embodiment, the data access service 204 generates the annotations 216 as a list of applicable policies that are based on the privacy policies explicitly provided by the client 202, by one or more policies inferred from the request context or other metadata, and possibly additional sources. For example, in some cases, the data 210 being stored may be subject to rules that are imposed based on the jurisdiction in which the data is to be stored—in such an embodiment, the data access service 204 may query the data store 206 to determine where the data element is stored (for the case of requests to modify an existing data element) or will be stored (for the case of requests to create a new data element), obtain one or more applicable privacy policies based on the storage location, and insert those entries to the list. It should be noted that while a list is described in connection with these embodiments, any suitable data structure such as an array, deque list, map, queue, tree, set, stack, map, or vector may be used.

The annotations 216 may be stored in association with the data. For example, the data store 206 and the annotation store 208 may be different database tables of a database systems, and the data 210 may be stored in one row with a reference to the primary key of a second row (e.g., of another database table) that stores the annotations. The annotations entry 220 may be stored as a row of a database table, or, more generally, in any suitable structured record store. As another example, the data 210 and the annotations 216 may be stored as fields in the same record.

Figure 3:
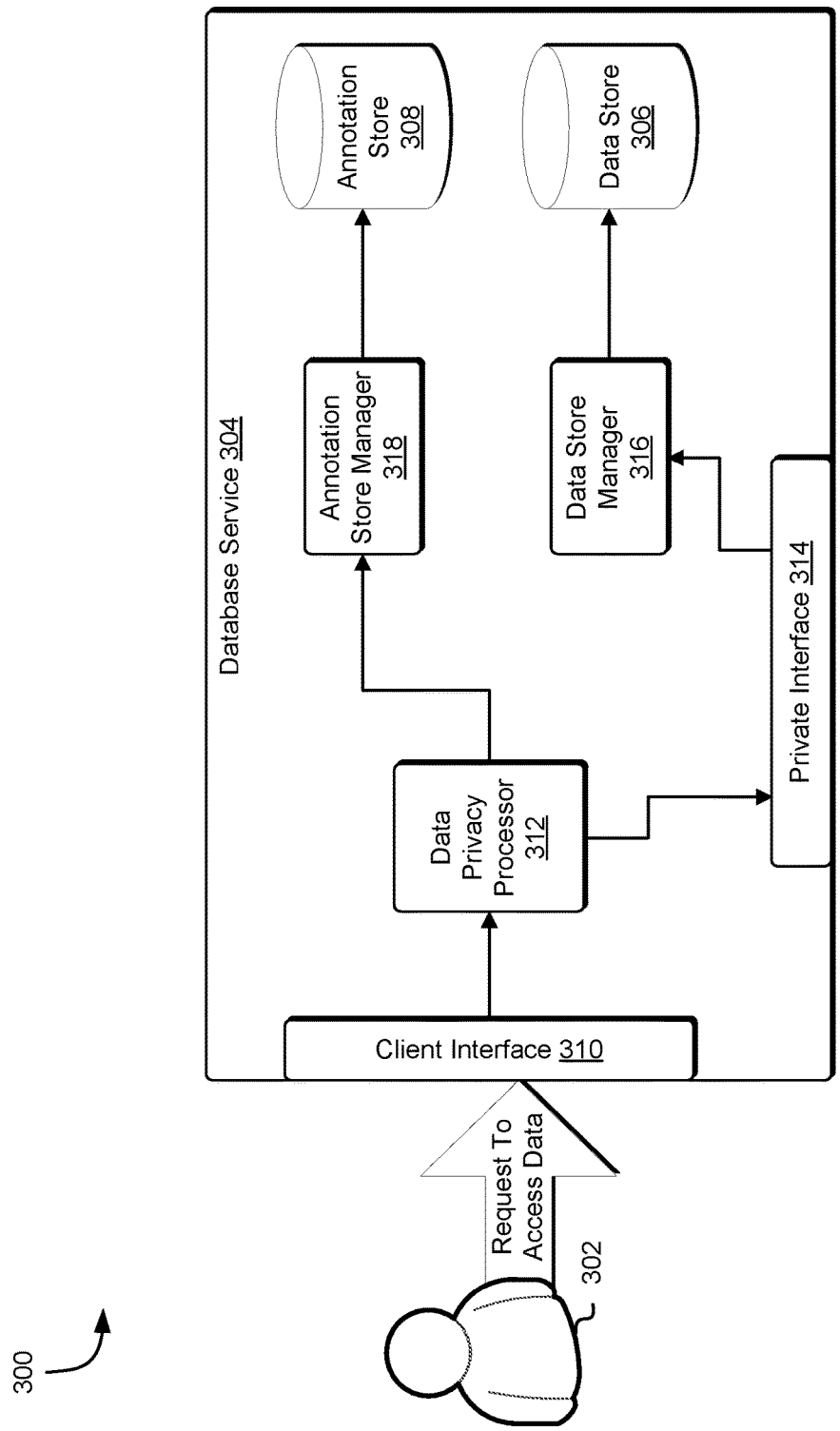
FIG. 3 illustrates a computing environment in which data is stored in connection with annotations that are applied to determine whether and/or how to fulfill a request to access data, in accordance with one embodiment.

FIG. 3 illustrates a computing environment 300 in which data is stored in connection with annotations that are applied to determine whether and/or how to fulfill a request to access data. FIG. 3 illustrates an embodiment in which a client 302 interacts with a database service 304 to make requests to access data. The client 302, data store 306, and annotation store 308 may be in accordance with those described elsewhere in this disclosure, such as those described in connection with FIG. 1.

The client 302 illustrated in FIG. 3 may refer to a client computing device that is operated by a client entity. The client 302 illustrated in FIG. 3 making the request to access data may be a different entity from the client discussed in connection with FIG. 2 that makes a request to write/modify data—in other words, it is not necessary for the entity that stores the data to later access the data—security credentials associated with different users may be utilized to authorize and/or authenticate requests to store and access data.

The database service 304 illustrated in FIG. 3 may be a service of a computing resource service provider that can be used to access database-related computing resources. The database service 304 may expose one or more interfaces that can be used by clients to write data, read data, and more. The database service 304 may be a relational database system or service that is managed in a computing resource service provider. In general, the database service 304 may support batched writes and/or reads, and may support accessing collections of data (e.g., a result-set of all data entries that meet a certain criteria). The database service 304 may be configured with one or more components, such as interfaces, one or more database management systems, and one or more database storage systems. FIG. 3 illustrates a database servicing having a client interface 310, a private interface 314, a data privacy processor 312, two store managers, and two data stores. In an embodiment, the database service 304 comprises a database instance running as an application in memory, and a database disk that stores structured data in one or more storage devices. The database instance may include various software components such as one or more of the data privacy processor 312, and store managers. The client 302 may interact with the database instance via one or more interfaces. The database instance may implement software that controls access to the database disks, which may be encapsulated in the store managers illustrated in FIG. 3.

In an embodiment, the client 302 and service 304 perform a handshake to establish a communications session and communicate via a client interface 310 that exposes one or more APIs that the client 302 is able to use to submit requests to the database service 304. The client interface 310 may include a list of parameters that includes an intended usage context and other parameters that specify what data is being requested. The other parameters may be passed through as parameters of an internal data request using a private interface 314.

In an embodiment, the private interface 314 is an interface that is not directly accessible to the client 302, or may be accessible to the client under certain circumstances (e.g., the client is an administrator that can obtain elevated privileges usable to access the private interface 314). The client interface 310 may be a wrapper around the private interface 314 (or a portion thereof) that performs additional privacy checks around requests to access data based at least in part on a parameter that indicates the intended use of the data. In some cases, an API of the client interface 310 may even have the same input and output parameters as the corresponding private interface 314 API, such as in the case where the private interface 314 includes an input parameter (e.g., a data blob) in which the intended use data may be encapsulated. The private interface 314 may be an interface that is usable to access data of the database service 304 without regard to whether one or more privacy policies apply to the requested data. For example, the private interface 314 may be utilized by administrators of the database service 304 to access data that would normally be inaccessible or other privileged users (e.g., an auditing account or a developer accessing the data in debug mode).

Requests received by the database service 304 via the client interface 310 may be routed to the data privacy processor which is used to obtain data from the data store, annotations from the annotation store, determine which data entries may be returned to the client, or some combination thereof. The data privacy processor 312 may be a software component in the form of an application, library, plug-in, etc. that is executed on one or more processors of the database service 304. The data privacy processor 312 may, for example, be a DLL module that is loaded by a database instance software application that is used to perform read and write operations on the database disks that store the underlying data records.

In an embodiment, the data privacy processor 312 receives the client request for data via the client interface 310 and the request may include one or more parameters that specify a collection of data to be returned, such as all records of a particular database table, all records from a database table that were generated within a particular date range, or any other suitable query. The data privacy processor 312 may use the one or more parameters to generate an internal request via an API exposed through the private interface 314 that is routed to the data store manager 316. In some embodiments, the data privacy processor 312 may submit an internal request for data directly to the data store manager 316 without using a second interface in the same or substantially similar manner as how the data privacy processor 312 accessing the annotation store manager 316 to obtain annotations from the annotation store 308.

In an embodiment, the data store manager 316 is a software component of the database service 304 implemented as (or as a part of) a software application including executable code that, as a result of execution by one or more processors, controls the storage and access of structured data to a storage medium. The database storage manager 316 may include software that is used to read data from and write data to the data store 306. For example, the data privacy processor 312 may request for all data entries created within a particular date range to be returned as part of a result set. The data privacy processor 312 may parse the returned data entries and the corresponding annotations to determine whether some or all of the data entries are to be excluded from the response to the client.

The annotation store manager 318 may be implemented in a substantially similar manner to the data store manager 316 described above. In some cases, the annotation store manager 318 is exposed to the data privacy processor via the private interface 314 in the same or substantially similar manner that the data store manager 316 could be exposed via the interface. The annotation store manager 318 may be used to facilitate access to annotation entries and collections of annotation store entries. The client request and/or internal request to the data store manager may be used to generate a corresponding query to obtain a collection of annotations that correspond to the data entries being requested. For example, if the client 302 request is for all data entries of the data store, the data privacy processor 312 may make a corresponding request to get a collection of all annotations. As a second example, if the client 302 makes a request for all data entries that are less than 90 days old, the data privacy processor 312 may route an internal request to the data store manager for all data store entries that were created less than 90 days ago and the corresponding annotation entries of the data store entries that were obtained. In some cases, there may be a mapping between structured data of the data store 306 and the annotation store 308 that can be used to efficiently determine which data store entries correspond to which annotation store entries. For example, if the annotation store and the data store are separate tables of a database, a third mapping table that includes primary keys of the records (as well as other fields, which may be useful for filtering and/or sorting) in both tables may be utilized for efficiently obtaining annotations from data entries or vice versa.

The data privacy process 312 may receive a client request for a set of data entries and forward the request to the data store manager 316 to obtain a collection of data entries that satisfies the client request. The data privacy processor 312 may also obtain a collection of corresponding annotation entries from the annotation store manager 318. The data privacy processor 312 may use privacy policies encoded in an annotation to determine whether the corresponding data element satisfies the privacy policies encumbering the release of the data to the client. For example, if the privacy policy indicates that the data element should only be used for internal use of an organization, the data privacy processor may use the client's credentials (e.g., as supplied by in the client request) to determine whether the data element should be excluded from a list of data entries that are returned to the client. The data privacy processor 312 may use a separate service (e.g., an identity authentication service) to verify the identity of the client.

Figure 4:
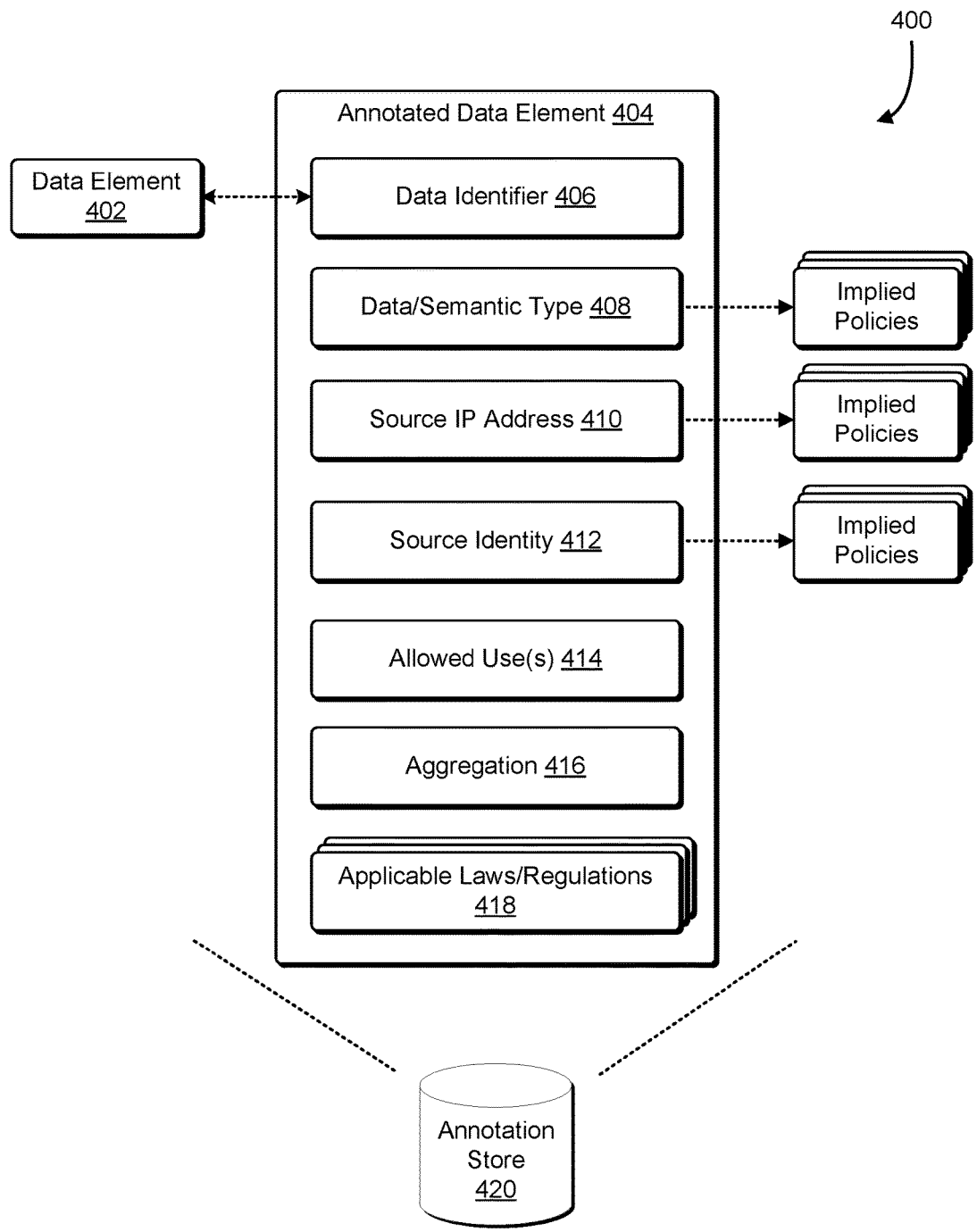
FIG. 4 illustrates a diagram of an example annotated data element that may be used in connection with various systems and methods described in this disclosure.

FIG. 4 illustrates a diagram 400 of an example annotated data element 404 that may be used in connection with various systems and methods described in this disclosure. The annotated data element 404 may be stored in an annotation store 420, which may be in accordance with those described elsewhere in this disclosure. For example, the annotation store 420 may be a database or database table and the annotation may be stored as a record or as a field of a record.

The data element 402 illustrated in FIG. 4 may refer to data that is associated with the annotated data element 404. The data element 402 and annotated data element 404 may be associated to each other (as illustrated by the dotted line) using techniques described elsewhere in this disclosure, such as through including a foreign key reference to the data element 402 as an attribute of the annotation 404 or vice versa.

An annotated data element 404 (also referred to as an annotation entry) may refer to information associated with data that indicates one or more constraints on how the data can be accessed or used. For example, an annotated data element 404 may include a data identifier, data type, source IP address, source identity, allowed uses, aggregation, application laws and regulations, and more. The data identifier 406 illustrated in FIG. 4 may refer to an identifier that is associated with the corresponding data element that the annotation should be applied to. The data identifier may be an identifier to a location of where the data is located (e.g., a foreign key and a list of columns in the target table). The data type 408 may be metadata associated with the data element that indicates whether the data has certain attributes. In an embodiment, a data element has a corresponding type and a corresponding identifier. For example, the data type may indicate whether the data element includes information classifiable as protected health information (PHI), personally identifiable information (PII), and etc. The data type may be represented as an enumerated data type, a bitmask wherein bits of the bitmask refer to different possible attributes of the data, and more. A data type 408, in some embodiments, can be mapped to an implied policy. As an example, if the data type indicates that the data associated with the annotation includes PHI, the PHI data type may be mapped to one or more implied policies corresponding to privacy policies based on laws and regulations that apply to PHI data, for example Health Insurance Portability and Accountability Act (HIPAA) in the United States. In some cases, the data type 408 may indicate that a client requesting access to the data provide additional information such as providing a verification that the client has received authorization to obtain the PHI data from the subject of the data. In an embodiment, the data type 408 refers to a semantic type, as described in greater detail below.

An annotated data element 404 may also include metadata associated with how and when the data was stored. In an embodiment, the annotated data element 404 encodes a source IP address 410 associated with the IP address that requested the data to be stored (e.g., as part of a write or modify request). The IP address may be utilized to determine one or more implied policies, such as in cases where the jurisdiction associated with the client submitting the data for storage has laws and regulation that govern the storage of the data. The IP address—or other types of network addresses—may be used to determine a geographical location associated with the data source and the geographical location can be used to identify laws and regulations of that state and determine whether any of them are applicable to the data being stored, which may also vary based on the type of data being stored.

Likewise, the annotated data element 404 may also include a source identity 412 which may be associated with a profile of the client that stored the data. For example, the profile may include an indication of an employee ID, employee organization name, organization subgroup (e.g., department within the organization), and more. The source identity 412 may also be mapped to an implied policy, such as when the source identity 412 is used to indicate that the data was obtained and stored on behalf of an organization that has certain privacy policies on how the data can be shared both within the organization (e.g., between departments) as well as with partners of the organization.

The annotated data element 404 may encode one or more allowed uses 414 of the data element. In an embodiment, the allowed uses 414 refer to types of uses that the data may be accessed for. For example, the allowed uses 414 may indicate that the allowed uses include use for all marketing partners, for internal use only (e.g., only by the organization that owns the data), only for use within a particular geographical region, and more. Aggregation 416 may refer to whether the data can be accessed as part of an aggregate request (e.g., a SELECT SUM(column) GROUP_BY other_column) or only by a request that specifically identifies the data element.

In an embodiment, the annotated data element 404 encodes one or more policies pertaining to applicable laws and regulation 418 that encumber how the data element 402 can be used. For example, if the data element 402 includes personal information associated with a minor of a particular state or jurisdiction, there may be applicable laws and regulations from that state or jurisdiction on how the data should be used. In an embodiment, the applicable laws and regulations 418 are encoded in a human-readable format such as a string referencing an organization's internal policies, as a string referencing a privacy regulation, a URI or URL that points to a network location that encodes an applicable privacy policy, and more. The privacy policy may also be encoded as a computer-meaningful format that corresponds to the human-readable policy as described above.

Figure 5:
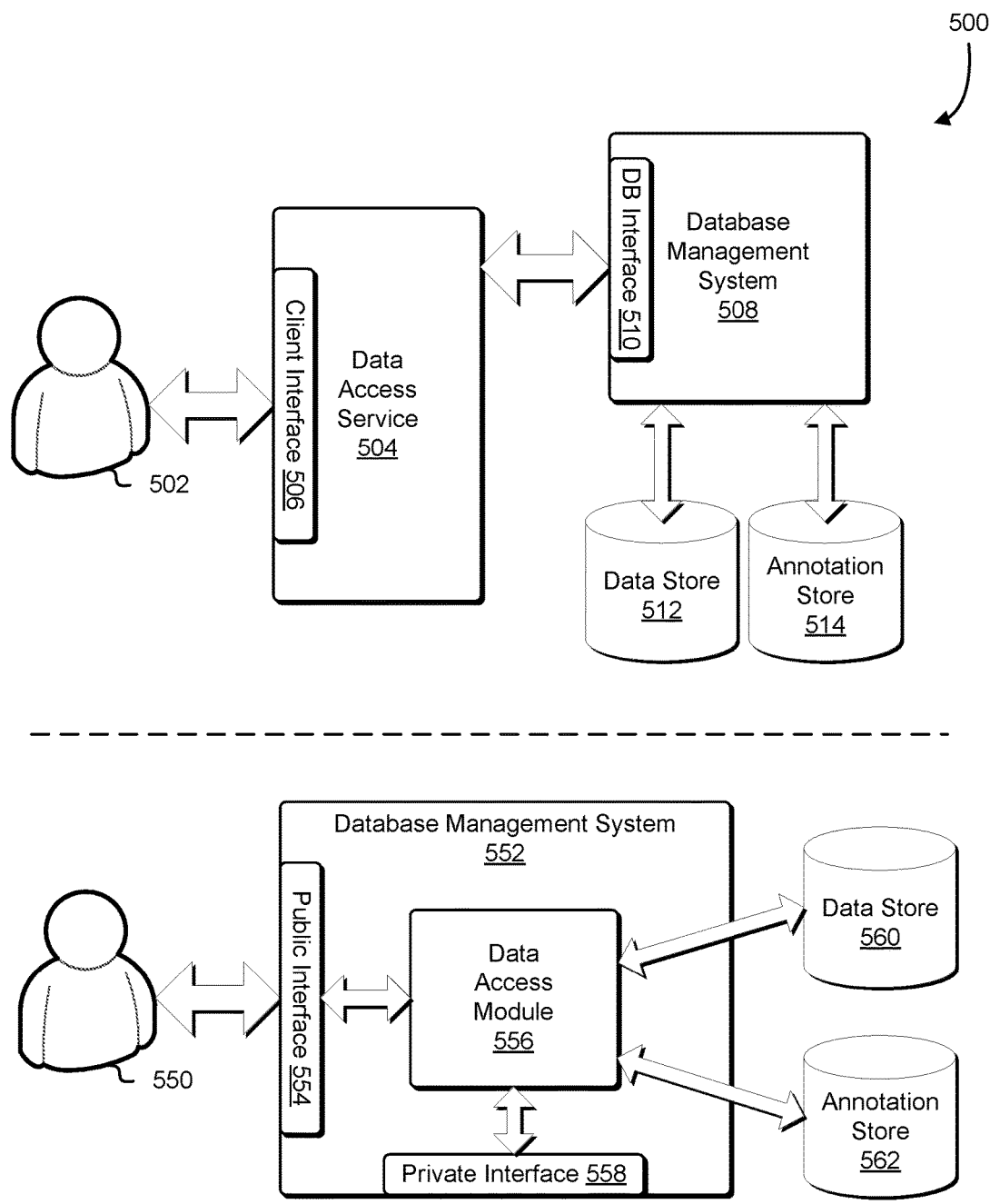
FIG. 5 illustrates a diagram of two different implementations that are usable to store and access data in association with annotations, in accordance with at least one embodiment.

FIG. 5 illustrates a diagram 500 of two different implementations that are usable to store and access data in association with annotations. In an embodiment (e.g., the top half of FIG. 5), a system is designed to have a data access service 504 sit between the client 502 and a backend database service 508 where the data access service 504 facilitates the storage of data (e.g., via write and modify operations) and access to data that may be subject to privacy policies encoded as annotations. The client 502 may be a client computing device in accordance with those described elsewhere in this disclosure.

The client 502 may submit requests to store data via the client interface 506 and the data access service 504 may perform the business logic to receive the data, determine privacy policies applicable to the data, encode the applicable privacy policies as annotations, associate the annotation to the data, and coordinate the storage of the data and annotations. In various embodiments, the data access service 504 utilizes a database management system 508 to store the data and annotations. The data access service 504 may also execute a routine to associate the stored annotation with the stored data. In some cases, the database management system 508 may be a database of a computing resource service provider that exposes generic database operations via a database interface 510. The data access service 504 may be used to extend the functionality of the database system to enforce privacy policies to the stored data.

The client 502 may submit requests to the data access service 504 via a client interface 506 which may include a set of parameters that specifies the data requested as well as one or more parameters specifying the intended use of the data. The data request may be routed by the data access service 504 to a database system 508 that is controlled or accessible to the data access service 504 via a database interface 510. In various embodiments, the database interface 510 is not exposed to the client 502 so as to prevent the client 502 from circumventing the data access service 504 to access data in the data store 512. The data access service 504 may execute the business logic associated with obtaining data entries and corresponding annotations, and processing the data entries to determine whether the client is allowed access to the data. The database management system 508 may store data and/or manage data and annotations in the data store 512 and annotation store 514 in accordance with techniques described elsewhere in this disclosure, such as in connection with FIGS. 1-4.

The bottom half of FIG. 5 may be used to illustrate an embodiment in which a client 550 interacts directly with a database management system 552 which has been configured to manage the storage and retrieval of data subject to annotations. In an embodiment, the client 550 interacts with the database management system 552 by submitting requests over a public interface 554. The client 550 may be in accordance with those described elsewhere in this disclosure.

Similar to the embodiment illustrated in the top half of FIG. 5, the client 550 may submit requests to store data via a public interface 554. However, the public interface 554 in this case allows the client 550 to interact directly with the database management system 552. The public interface 554 may expose APIs that include the ability for the client 550 to submit requests to store data subject to privacy policies and to retrieve data for specific intended uses. A private interface 558 may expose a different set of APIs that, for example, allow the caller (e.g., an administrator or other privileged user) to access data without being subjected to privacy policies. The client 550 may utilize the public interface 554 to submit a request to store data, wherein the request may include the data, one or more privacy policies, and a request context. The data access module 556 may be used to coordinate the storage of the data (e.g., by making an internal API call to a write operation exposed through the private interface 558) and generating annotations to store in association with the data. The data and annotations may be stored in the data store 560 and annotation store 562 in accordance with techniques described elsewhere in this disclosure, such as in connection with FIGS. 1-4.

The client 550 may also use the public interface 554 to request access to data stored and managed by the database management system 552. The database management system 552 may route requests received via the public interface 554 to the data access module 556 and the data access module may implement and execute business logic around obtaining a collection of data entries from the data store 560 and the corresponding collection of annotations from the annotation store 562 and determining whether to exclude any data from being returned to the client 550 based at least in part on evaluating the annotations to determine whether any applicable privacy policies preclude the access from being provided in response to the client request. The data access module 556 may include an application, library, plug-in, extension, or other suitable form of software that is usable by the database management system 552 to coordinate the access and storage of data and annotations.

Figure 6:
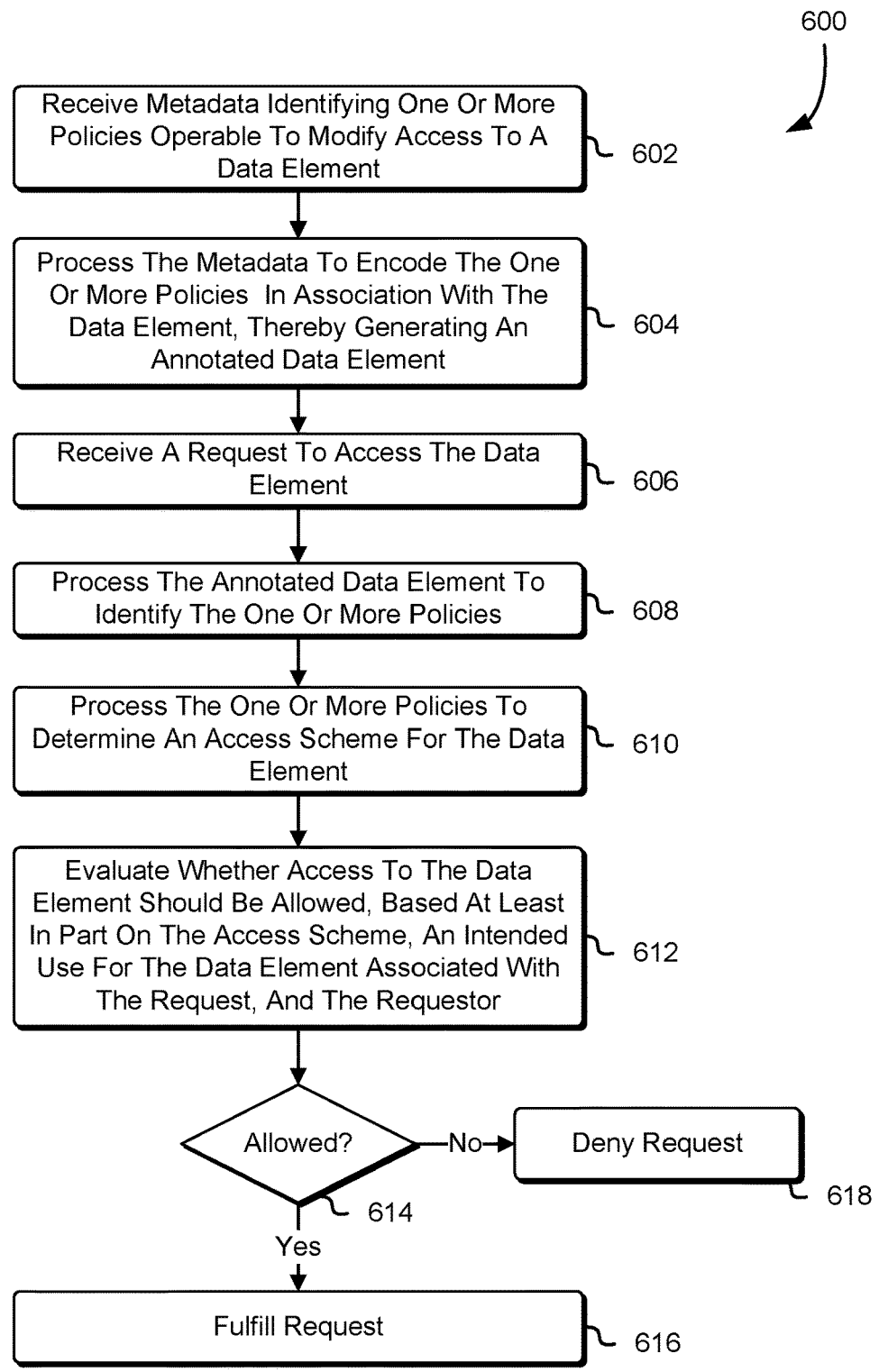
FIG. 6 shows an illustrative example of a process for granting access to data and/or information associated with data according to annotations, in accordance with an embodiment.

FIG. 6 shows an illustrative example of a process 600 for granting access to data and/or information associated with data according to annotations, in accordance with an embodiment. Some or all of the process 600 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of instructions executable by one or more processors. The computer-readable storage medium may be a non-transitory computer-readable medium. In some embodiments, at least some of the instructions usable to perform the process 600 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. The process 600 illustrated in FIG. 6 may be implemented in accordance with techniques described in connection with other figures discussed in this disclosure, such as those described in connection with FIGS. 1-5, and 7.

As an example, the process 600 may be implemented at least in part using a data access service as described in connection with FIG. 1. In an embodiment, a data access service is configured (e.g., via executable code stored and/or loaded on one or more processors of a computer system) to receive 602 metadata identifying one or more policies operable to modify access to a data element. The one or more policies may be received as part of a request to store the data. In some cases, the metadata is received in association with a request or routine to write the data (e.g., creating a new database record to store the data), whereas in other cases the metadata is received in association with a request or routine to modify existing data (e.g., replace the data and/or annotation associated with an existing database record with new data specified in the request).

The system performing the process 600 (e.g., a data access service or database management system in accordance with those described in FIG. 5) may process 604 the metadata to encode the one or more policies in association with the data element, thereby generating an annotated data element. The metadata can be processed to generate the annotated data element using various techniques, such as those described in connection with FIGS. 2 and 4. In various embodiment, the annotated data element is stored in association with the corresponding data element, such as in a mapped database table that allows for efficient queries from the data element record to the annotated data element record, such as by utilizing a foreign key reference and database index to enable fast (e.g., O(log n) binary search) look-ups from the data element to the corresponding annotated data element and/or reverse look-ups. Data elements and/or annotated data elements may be stored in association with a request made by a client to a data access service (e.g., a request to write or modify data).

In an embodiment, the system receives 606 a request to access the data element described above. It should be noted that the requestor that requests access to the data element may be a different requestor from a requestor that initially requested storage of the data element. The request may be made via an interface and may include a request context that is used to evaluate whether particular data entries should be provided as part of the response. The request context may include information such as the IP address of the requestor, an intended use indicating how the requested data is to be used, identity information of the requestor (e.g., whether the requestor is part of an organization the data belongs to or a third-party organization), and more. In some cases, the request to access data may be an aggregate request, such as a request to access the sum of values in a subset of stored data elements that includes the aforementioned data element. Such aggregate requests that do not return data from individual records may be subject to different privacy restrictions.

In response to the request to access the data element, the system may perform one or more steps to determine whether and/or how to fulfill the request. The one or more steps may include processing 608 the annotated data element to identify the one or more policies. In an embodiment, the annotated data element is queried from a database table by first obtaining a database record of the data element (e.g., as part of a result set), obtaining a foreign key reference from the record, and querying the corresponding annotated data element from the foreign key reference. The annotated data element may encode the one or more policies using various techniques, such as directly encoding a policy in the annotated data element (e.g., as a data structure or serialized stream of bits) or by encoding information usable to determine an implied policy. Examples of such implied include encoding a data type usable to determine an implied policy (e.g., the data element includes PHI or PII information which maps to an applicable rule or regulation). Additional examples of implied policies are described elsewhere in this disclosure, such as in connection with FIG. 4. In some cases, the steps to determine whether and/or how to fulfill the request will depend at least in part on whether the request is a request for aggregated data or atomic data—in an embodiment, one or more policies associated with aggregated data allow for broader use of the data as compared with when the request is a request for atomic data (e.g., data associated with a particular identity or that can easily be resolved to a particular identity). For example, consider an example in which user data related to an attribute (credit score for users, user's occupation, whether the user has been in bankruptcy, etc.) is recorded—in an embodiment, an aggregate request for the count of users that have a credit score in a particular range (e.g., credit scores over 800) is fulfilled, thereby allowing a requestor to determine what percentage of the users have an "excellent" credit score, but an atomic request for a set of rows restricted based on users having a credit score in a particular range (e.g., SELECT*WHERE CREDITSCORE>800) may be filtered or denied based on the one or more policies, which may restrict the requestor. For example, the request for all rows having a credit score of greater than 800 as described above may be filtered so that the result set only includes certain columns (e.g., those that do not include personally identifiable information such as name, address, phone number, etc.), only one column (e.g., only the credit score column is returned in the result set), post-processed data (e.g., the credit score column is obtained and the individual credit score values are replaced by "TRUE" or another suitable placeholder value that further protects the user's data).

The system may, as part of determining how to respond to the request to access the data element, process 610 the one or more policies to determine an access scheme for the data element. In an embodiment, processing the one or more policies to determine an access scheme for the data element is performed as part of determining whether and/or how to provide access to a data element or a portion thereof. The access scheme for the data element may refer to an algorithm, routine, function, or any other type of scheme that is usable to identify data that is allowed to be used for the request. In some embodiments, such as those that utilize relational databases that support a query processor, the access scheme may be determined based at least in part on a query that includes rows of a database table that should be included in a result set (perhaps for additional evaluation based on the request context), excludes rows of a database table that should be inaccessible, or a combination of both. Similarly, the scheme may be determined based at least in part on a query that includes columns of the database table that should be included in a result set, excludes columns of the database table, or a combination of both. In an embodiment, the metadata includes a set of rules that identifies a manner in which conflicts between a first policy and a second policy of the one or more policies are to be resolved and the access scheme is determined in accordance with the manner and based at least in part on the set of rules. A conflict can exist where, for example, a first policy and a second policy resolve (either implicitly or explicitly) to different answers with respect to whether a grant of access should be allowed. For example, a first policy, when evaluated for a given request, may resolve to grant access to a data element (or portion thereof) in connection with fulfilling the request, whereas a second policy, when evaluated against the same request, may resolve to deny access to that same data element (or portion thereof). Resolution of policies to different grants of access may be based on implicit rules, such as deny-by-default logic that causes a policy to deny access in the absence of an affirmative grant of access to a resource. For example, the rules may encode logic for how privacy policy elements interact and relate to each other, such as how what is more restrictive than others. For example, a rule that allows data to be shared with partner organizations implies that the data can be shared with specific types of partner organizations, such as marketing partners and retail partners. The manner can also include resolving a conflict by collapsing the second policy into the first policy as a result of determining that the first policy is more restrictive than the second policy (e.g., as between two or more policies, the first policy is the most restrictive policy). For example, if the first policy encodes a rule that allows data to be shared with all partners but the second policy encodes a rule that allows the data to only be shared with marketing partners, the policies are collapsed so that the rule allowing data to only be shared with the marketing partners is used for the access scheme.

The system may evaluate 612 whether access to the data element should be allowed, wherein the evaluation is based at least in part on the access scheme, an intended use for the data element associated with the request, and the requestor. The system may identify information associated with the data element to which the requestor is allowed to access, wherein the information is identified based at least in part on the access scheme, the requestor, and an intended use for the data element, the intended use associated with the request. For example, a data access service may access a backend database server to obtain a result set including a collection of data elements, enumerate the collection, and remove data elements based on the intended use, the requestor's identity, and other criteria such as based on the detection of additional implied policies—for example, if the intended use indicates the data is to be used for a marketing effort in a geographical location for a class of products (e.g., one or more adult products such as tobacco and/or alcohol), data elements for minors (e.g., as defined by applicable rules of the geographical location) may be excluded based on an implied policy.

The system may determine whether 614 access is allowed. If access is allowed, the system fulfills the request 616 according to the access granted. For example, if the requestor is granted limited or partial access to a result set (e.g., access to only a subset of a data elements is granted) then the subset may be returned to the user as if the subset were the entire result set (e.g., a fixed-length array is re-sized to have an allocated memory size corresponding to the subset rather than the entire result set that had elements excluded from the response). In some cases, data elements or portions thereof may be redacted, based on the access scheme. In some cases, no access is granted, and then the system denies 618 the request in any suitable manner, such as by providing a generic error code (e.g., E_FAIL), a specific error code (e.g., E_INCOMPATIBLE_USE and/or additional information indicating data elements are no accessible based on the received request), a timeout (e.g., no response is provided until the request times out), and more. Further, the response may be annotated with further human or machine-readable instructions on use of the returned data. For example, the data may be annotated as needing to be destroyed within 48 hours of the response.

Data elements may be annotated with basic pieces of information such as its semantic type and how each column relates to other fields (e.g., other columns). These pieces of information may then be used to create, generate, or derive additional features, in some cases with different semantic contexts and/or types than those of the input feature(s), pertaining to the dataset. Specifically, the semantic type of a feature may describe the kind of information that the data in the features represents. The information about how each column relates to other fields may indicate the interdependencies or relationship between each of the columns in the dataset. For example, a zip code feature may be marked as containing information intimately correlated to the city and state features in the record.

Metadata may include information such as the semantic type. Thus, features can then be identified and tagged to form a subset of the input data based at least in part on the metadata that includes information pertaining to semantic types.

In an embodiment, input data is processed to generate additional features for new data. A system, such as a computing environment as described in connection with FIG. 1, may use a semantics processor to process input data to identify a first feature and a second feature in the input data. The semantics processor may be part of the computing system environment by running on a computing device connected to other devices or the semantics processor may be separate from a computing system environment and running on a virtual machine hosted by a computing resource service provider. In an embodiment, the semantics processor may be the system itself. In an embodiment, the semantics processor may identify, based on a semantic context, a programmatic interface to retrieve additional data associated with the features. The semantics processor or a separate device associated with the computing environment may then retrieve the additional data via the programmatic interface and further cause the system to generate the new data based at least in part on the retrieved additional data.

In an embodiment, the first feature and the second feature respectively correspond to a first subset of the input data and a second subset of the input data. Moreover, in an embodiment, the first subset of input data may have a first semantic type and the second subset of input data may have a second semantic type. For example, a semantic type may indicate that a column of information is a "Product Name." Specifically, a column of data or information may contain a list of all the products that a customer purchased and the semantic type for that column may be indicated as the "Product Name." In some instances, the first semantic type is identical to the second semantic type. In other instances, the first semantic type is different from the second semantic type.

Figure 7:
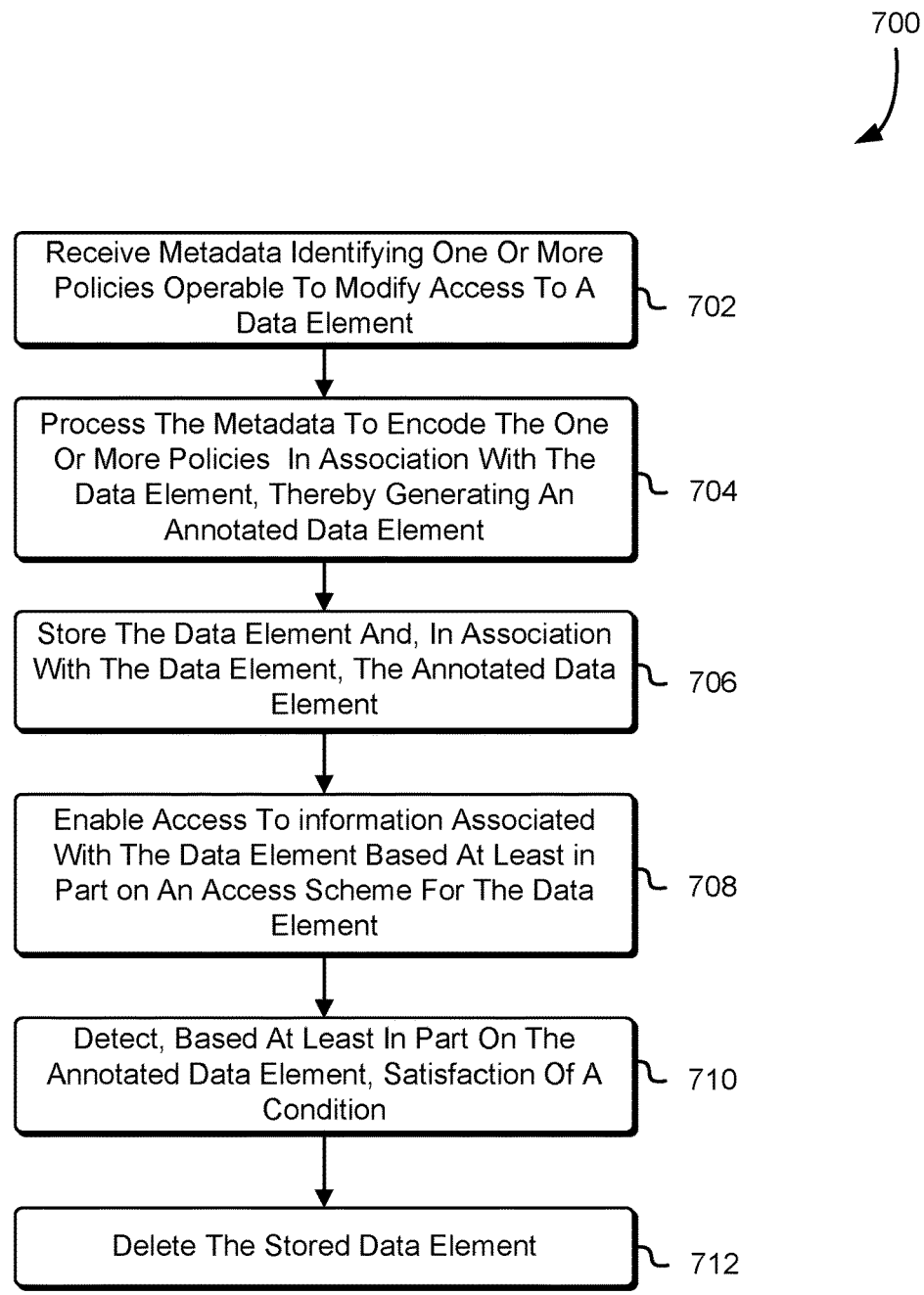
FIG. 7 shows an illustrative example of a process for managing the lifetime of data elements based on policies, in accordance with an embodiment.

FIG. 7 shows an illustrative example of a process 700 for managing the lifetime of data elements based on policies, in accordance with an embodiment. Some or all of the process 700 (or any other processes described herein, or variations and/or combinations thereof) may be implemented using systems and techniques described in connection with FIG. 6. The process 700 illustrated in FIG. 7 may be implemented in accordance with techniques described in connection with other figures discussed in this disclosure, such as those described in connection with FIGS. 1-6.

The system, which may be implemented using a data access service described in accordance with FIG. 1, may receive 702 metadata identifying one or more policies operable to modify access to a data element. The system may also process 704 the metadata to encode the one or more policies in association with the data element, thereby generating an annotated data element. In some cases, these techniques are based on those described in FIG. 6. The annotated data element may include one or more rules that specify the manner in which the data element is to be stored, including but not limited to a predetermined or predefined period for which the data can be stored for (e.g., 90-days limit), a timestamp (e.g., Dec. 31, 2018), and more. The timestamp may be encoded in any suitable format, such as according to a particular type of data structure (e.g., a FILETIME or SYSTEMTIME) and/or a particular data format (e.g., ISO 8601 compliant format). Generally speaking, these are just illustrative examples of temporal conditions that can define the lifetime of the data object, and other such conditions may exist, such as allowing the data to only be accessed a predetermined number of times or a limited number of times for certain types of requestors such as third-party organization. These techniques, in addition to others discussed elsewhere in this disclosure, may be used to protect stored data against excessive usage by an organization or by a delegated entity (e.g., third-party organization) which may be an indication that data is being scraped and/or that the data is being accessed in an unexpected (and possibly unintended/unauthorized) manner. Various countermeasures may be taken upon detecting that data is being accessed in an unexpected manner, such as by updating or creating a policy that prohibits the unexpected behavior, which may be specific (e.g., preventing specific types of queries) or generalized (e.g., a user that exceeds a predetermined number or rate of queries is locked out of access to some or all stored data until an administrator is able to review activity logs and determine whether to restore access to the user).

In an embodiment, the system stores 706 the data element using any suitable storage system such as a database or any other suitable type of structured record store. The storage system may include capabilities that allow for association of the data element to the annotated data element, which may be stored in a database table separate from the database table that stores the data element. However, in some cases, both the data element and the annotated data element are stored in the same record (or row) of a database. A database management system or service may be utilized to facilitate storage of the data element. As part of storing the data element and the annotated data element, a data access service may enable 708 access to information associated with the data element based at least in part on an access scheme for the data element. In an embodiment, the access may be provided based at least in part on the process described in connection with FIG. 6.

After the data is stored, the system may later detect 710, based at least in part on the annotated data element, satisfaction of a condition such as a certain amount of time elapsing, a timestamp passing (e.g., the local time is detected to be later than the time encoded in a timestamp of the annotated data element). In response to determining satisfaction of the event, a routine may be executed that causes the stored data element to become inaccessible or modified. In some cases, the data element is deleted 712 outright, making it irretrievable by clients of a data access service. However, in other cases (e.g., where a number of uses of the data has been exceeded, according to a rule) the data may be marked as being temporarily locked, and accessibility may be restored by an administrator providing authentication information. The authentication information may be a command issued by the administrator that is digitally signed and is verifiable by the data access service or an authentication service on behalf of the data access service.

In cases where the data element is to be deleted or modified (e.g., based on a temporal condition) the system may utilize a background program or background task to perform the deletion of the data element. In some cases the background task is run periodically (e.g., midnight every day/week/month) so as to batch the deletion of multiple data elements which may have deletion rules that are close but not identical to each other.

Figure 8:
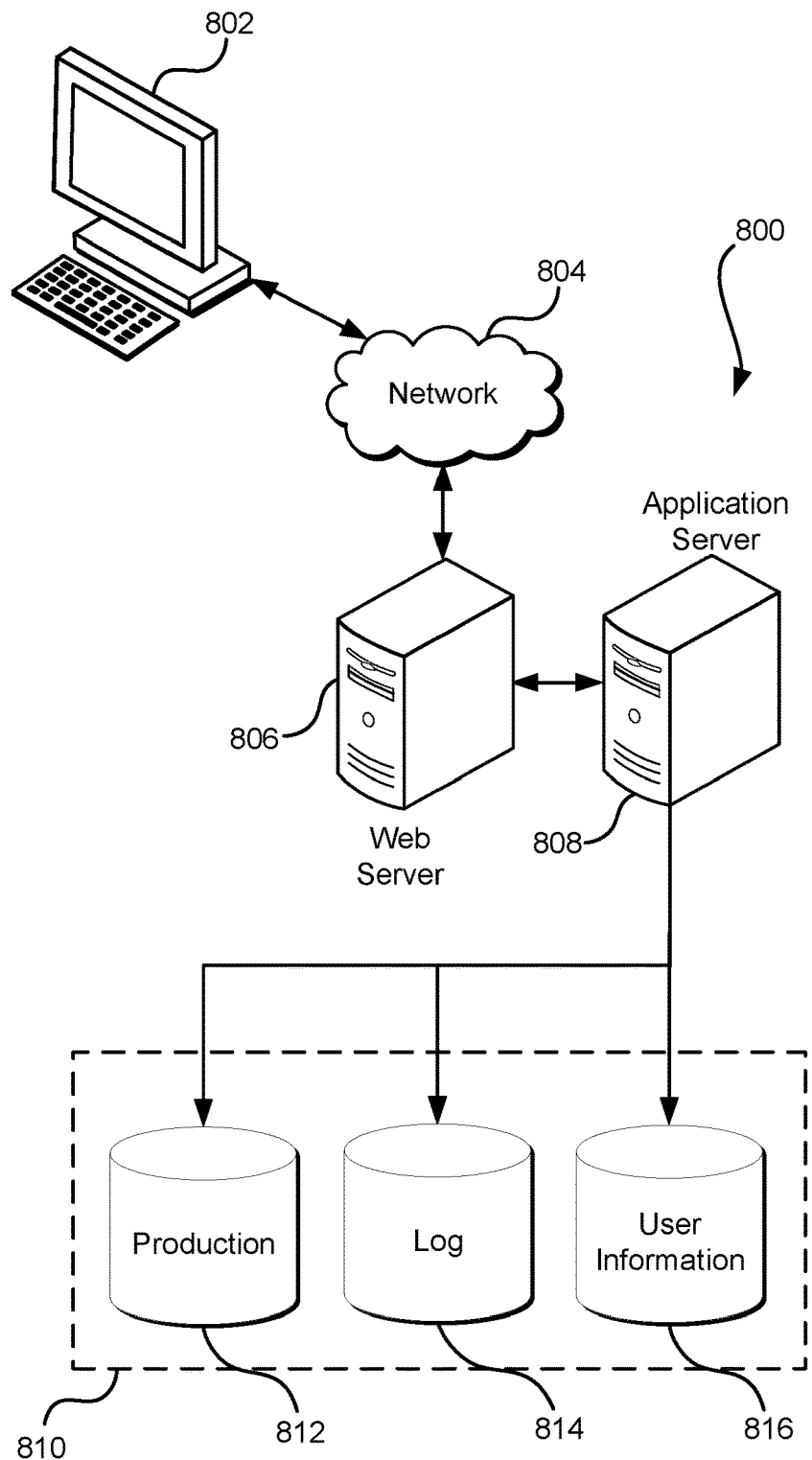
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing source files 814, which is used, in an embodiment, for analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage a plurality of source files.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers may include, without limitation, those commercially available from Oracle®, Microsoft®, Sybase®, and IBM® as well as open-source servers such as MySQL, Postgres, SQLite, MongoDB, and any other server capable of storing, retrieving, and accessing structured or unstructured data.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
one or more processors;
memory that stores computer-executable instructions that, if executed, cause the one or more processors to:
receive, in connection with a data element having a corresponding identifier and a corresponding type, metadata identifying a policy operable to define access to the data element;
process the metadata to encode the policy with the data element, thereby generating an annotated data element, wherein the annotated data element comprises at least:
the corresponding identifier, usable to determine the data element from the annotated data element;
the type, wherein the type can be mapped to one or more implied policies; and
aggregation data, usable to determine a manner in which to process the data element in connection with aggregated requests; and
in response to a request, by a requestor, to access the data element:
process the annotated data element to identify the policy;
process the policy to determine an access scheme for the data element;
identify information associated with the data element to which the requestor is allowed to access, wherein the information is identified based at least in part on the access scheme, the requestor, whether the request is an aggregated request, and an intended use for the data element, the intended use associated with the request; and
provide the information to the requestor.

2. The system of claim 1, wherein the information associated with the data element that is provided to the requestor is annotated with one or more allowed uses.

3. The system of claim 1, wherein the policy is a human-readable policy.

4. The system of claim 1, wherein:
the policy is a first policy;
the metadata includes a second policy, a conflict existing between an evaluation of the first policy and the second policy; and
the system further includes instructions to process the first policy and the second policy to resolve the conflict, and to determine the access scheme based at least in part on resolution of the conflict.

5. The system of claim 1, wherein the policy is identified based at least in part on a semantic type associated with the data element.

6. The system of claim 4, wherein resolving the conflict comprises identifying, based on the intended use, a most restrictive policy between the first policy and the second policy.

7. The system of claim 1, wherein the information is a subset of the data element.

8. The system of claim 7, wherein the subset of the data element comprises only a portion of the data element to which the requestor is allowed access for the intended use.

9. A computer-implemented method, comprising:
receiving, in connection with a data element, a semantic type associated with data of the data element;
generating an annotated data element by at least determining, from the semantic type, one or more policies applicable to the data element, wherein the annotated data element comprises at least:
a corresponding identifier, usable to determine the data element from the annotated data element;
the type, usable to determine one or more implied policies; and
aggregation data, usable to determine a manner in which to process the data element in connection with an aggregated request;
in response to detecting a request, by a requestor, to access the data element:
processing the annotated data element to identify the one or more policies;
processing the one or more policies to determine an access scheme for the data element;
determining information associated with the data element to which the requestor is allowed to access, wherein the information is identified based at least in part on the access scheme, the requestor, and an intended use for the data element, the intended use associated with the request; and providing the information to the requestor.

10. The computer-implemented method of claim 9, wherein:

the request to access the data element encodes the intended use; and the information is a subset of the data element that the requestor is allowed to access for the intended use.

11. The computer-implemented method of claim 9, wherein the information to which the requestor is allowed access to is determined further based at least in part on one or more attributes of the request.

12. The computer-implemented method of claim 9, wherein:

the data element is associated with a person and the semantic type corresponds to an attribute of the person; and the one or more policies include a policy that is determined to be applicable based at least in part on the attribute of the person.

13. The computer-implemented method of claim 9, wherein the access scheme is determined based at least in part on whether the request is a request for aggregated data.

14. A non-transitory computer-readable storage medium having stored thereon executable instructions that, as a result of being executed by one or more processors of a computer system, cause the computer system to at least:

receive, in connection with a data element having a corresponding identifier and a corresponding type, metadata identifying one or more policies operable to modify access to the data element;

process the metadata to encode the one or more policies with the data element, thereby generating an annotated data element, wherein the annotated data element comprises at least:

the corresponding identifier, usable to determine the data element from the annotated data element;

the type, usable to determine one or more implied policies; and aggregation data, usable to determine a manner in which to process the data element in connection with an aggregated request;

store the data element and, in association with the data element, the annotated data element, wherein access to information associated with the data element is determinable based at least in part on an access scheme for the data element and an intended use for the data element, further wherein the access scheme is determined based at least in part on the one or more policies; and in response to detecting, based at least in part on the annotated data element, satisfaction of a condition, cause the stored data element to become inaccessible.

15. The non-transitory computer-readable storage medium of claim 14, wherein the instructions that cause the data element to become inaccessible include instructions that cause the data element to be deleted.

16. The non-transitory computer-readable storage medium of claim 14, wherein satisfaction of the condition is based at least in part on a temporal condition.

17. The non-transitory computer-readable storage medium of claim 16, wherein the temporal condition is associated with storage of the data element for a predefined period.

18. The non-transitory computer-readable storage medium of claim 16, wherein the temporal condition is associated with a timestamp specified in the annotated data element passing.

19. The non-transitory computer-readable storage medium of claim 14, wherein the intended use is associated with a class of products.

20. The non-transitory computer-readable storage medium of claim 14, wherein the instructions include instructions that, if executed, further cause the computer system to restore accessibility to the data element in response to receiving and verifying authentication information.

* * * * *